United States Patent
Denecker et al.

[11] Patent Number: 4,986,742
[45] Date of Patent: Jan. 22, 1991

[54] PROCESS FOR THE PRODUCTION OF HIGH-GRADE TITANIUM DIOXIDE BY SULFATE METHOD

[75] Inventors: Gabriël Denecker; Werner Verhoeven, both of Kalmthout; Joel Leuridan, Antwerp; Domien Sluyts, Stabroek, all of Belgium

[73] Assignee: Bayer Aktiengesellschaft, Leverkusen-Bayerwerk, Fed. Rep. of Germany

[21] Appl. No.: 395,292

[22] Filed: Aug. 17, 1989

Related U.S. Application Data
[63] Continuation of Ser. No. 878,277, Jun. 25, 1986, abandoned.

Foreign Application Priority Data
Jul. 5, 1985 [DE] Fed. Rep. of Germany ....... 3524053

[51] Int. Cl.⁵ ............................................. C22B 24/12
[52] U.S. Cl. .................................... 423/82; 423/70; 423/610; 423/616; 75/1 T; 75/101 R; 75/101 BE; 75/115; 75/121
[58] Field of Search ................... 423/616, 70, 82, 610; 75/1 T, 10 BE, 101 R, 115, 121

[56] References Cited
U.S. PATENT DOCUMENTS
3,067,010 12/1962 Long et al. ............................ 423/70
3,971,843 7/1976 Helgorsky et al. .................. 423/181
4,499,058 2/1985 Fitoussi et al. ....................... 423/70

FOREIGN PATENT DOCUMENTS
257908 3/1965 Australia ............................... 423/70
90692 10/1983 European Pat. Off. ............. 423/70
0145984 6/1985 European Pat. Off. .
0207403 1/1987 European Pat. Off. .
1067011 10/1959 Fed. Rep. of Germany .
2620065 11/1976 Fed. Rep. of Germany ........ 423/70
1192632 3/1981 Fed. Rep. of Germany .
789497 1/1958 United Kingdom .................. 423/82
1168599 10/1969 United Kingdom .................. 423/82
1552918 5/1976 United Kingdom .................. 423/70
2055781 3/1981 United Kingdom .

OTHER PUBLICATIONS
Ullmanns Enzyklopadie der Technischen Chemie, 4th Edition, vol. 18, pp. 574 thru 576.

Primary Examiner—Robert L. Stoll
Assistant Examiner—Paige C. Harvey
Attorney, Agent, or Firm—Connolly and Hutz

[57] ABSTRACT
High-grade titanium dioxide is produced by
(a) reacting ilmenite or titanium-containing slag with sulfuric acid,
(b) dissolving the material from (a) with water or dilute sulfuric acid,
(c) separating insolubles from (b) to obtain a black solution containing titanyl sulfate and foreign metal salts, extracting titanyl sulfate from the black liquor with sulfuric acid and an organic medium containing an organophosphorus compound, separating the foreign metal salts in an aqueous extract phase, recovering titanyl sulfate from the organic extract phase, and hydrolyzing the titanyl sulfate to titanium oxide hydrate.

15 Claims, 1 Drawing Sheet

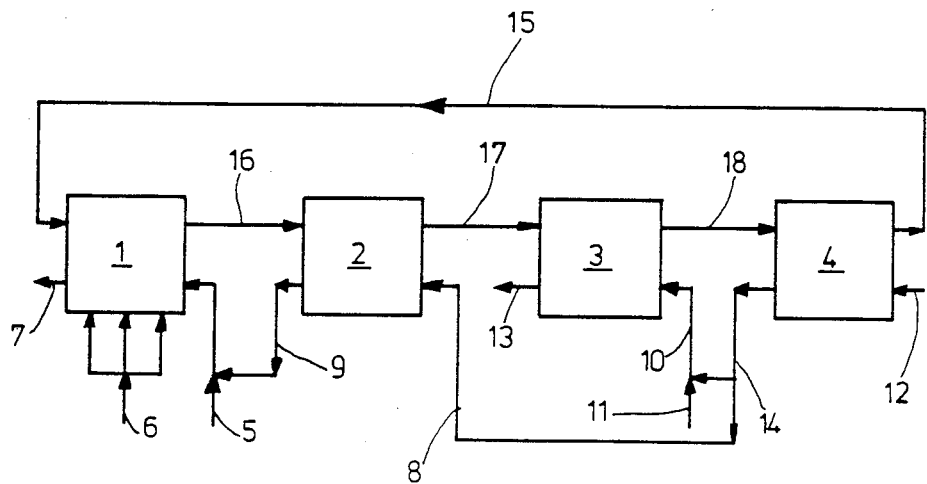

PROCESS FOR THE PRODUCTION OF HIGH-GRADE TITANIUM DIOXIDE BY SULFATE METHOD

This application is a continuation, of application Ser. No. 06/878,277, filed June 25, 1986 now abandoned.

BACKGROUND OF THE INVENTION

This invention relates to an improvement in the process for production of titanium dioxide using the sulfuric acid digestion method by reacting ilmenite and/or titanium-containing slags with highly concentrated sulfuric acid, dissolving the solid reaction product with water and/or aqueous sulfuric acid, and separating the insoluble raw material fraction to obtain a sulfuric-acid-containing titanylsulfate solution rich in foreign metal salts (hereinafter referred to as the "black solution").

In optional steps, trivalent iron can be reduced and after crystallization of iron sulfate heptahydrate, that material can be separated. Thereupon, the black solution is subjected to hydrolysis, with subsequent separation of the titanium oxide hydrate which is precipitated, intensive washing with water, drying and, optionally, calcination.

PRIOR ART BACKGROUND

In the conventional production of $TiO_2$ using the sulfate method by reacting ilmenite and/or titanium-containing slags with highly concentrated sulfuric acid, dissolving the solid reaction product with water and/or dilute aqueous sulfuric acid and separating the insoluble raw-material fraction, sulfuric-acid-containing $TiOSO_4$-solutions (black solutions) are obtained which are generally contaminated to a large extent by foreign metal ions. The foreign metal ions in question are primarily iron, aluminium and magnesium and, in addition, lower concentrations of heavy metals such as, for example, manganese, vanadium, chromium, and niobium.

In addition, during or after the dissolving step, all the $Fe^{III}$ can be reduced to $Fe^{II}$ and a small part of the $Ti^{IV}$ to $Ti^{III}$ by addition of iron scarp, producing a further increase in the iron content.

In digestion processes using ilmenite, some of the iron ions have to be removed from the $T^{III}$-containing digestion solution (black solution) before hydrolysis. This is normally achieved by cooling, crystallization and separation of "green salt" ($FeSO_4.7H_2O$). However, most of the other foreign metals remain behind in the black solution. By contrast, in the digestion of slag, the iron compounds are not normally separated off in view of the lower iron content.

German No. 2,620,065 describes an extraction process for removing $Cr^{III}$ and $Nb^V$ from the black solution, although in this process good extractability of the $Cr^{III}$-ions can only be obtained by heating the black solution to temperatures of from 50° to 80° C. with long contact times and high concentrations of free acid.

There are no known purification processes for removing all the foreign metals from the black solution to be hydrolyzed. Accordingly, the processes for hydrolyzing dissolved titanylsulfate with precipitation of titanium oxide hydrate are always carried out in the presence of relatively high concentrations of foreign metals, such as iron, manganese, vanadium, chromium, niobium, aluminium and magnesium.

In precipiation reactions of the type in question, small quantities of the above-mentioned color-producing foreign metals are co-precipitated in hydroxide or oxide hydrate from and/or are adsorbed onto the precipitated titanium oxide hydrate. The result is that, after filtration to remove the mother liquor of the hydrolysis reaction laden with foreign metal ions and generally containing from about 20 to 30% of sulfuric acid, (hereinafter referred to as "thin acid"), the solids must be subjected to a very elaborate washing process. This is generally carried out in several stages and using very large quantities of water with intermediate bleaching to dissolve out the impurities containing foreign metals under nascent conditions.

Accordingly, the object of the present invention is to provide a process for the production of titanium dioxide using the sulfate method which can be economically carried out on an industrial scale and which does not have any of the above-described disadvantages of known processes. More particularly, the black solution heavily laden with foreign metal ions is to be converted into a hydrolyzable $TiOSO_4$ solution substantially free from foreign metal salts, so that the precipitation of titanium oxide hydrate may be carried out in the virtual absence of foreign metal ions.

It is known from European No. 90,692 that $Ti^{IV}$-ions can be recovered from aqueous solutions containing sulfuric acid and, more particularly, from the thin acid by extraction. The organic extractant used contains compounds from the group comprising phosphonic acid diesters, phosphinic acid monoesters and phosphine oxides. To ensure good extractability of the titanium, the solution to be extracted must be made highly concentrated before extraction by distilling off water. In the case of the black solution, however, this is not readily feasible due to the likelihood of spontaneous hydrolysis and, in addition, due to the highly viscous, syrupy nature of the concentrate. Where extraction is carried out from this concentrate, large quantities of sulfuric acid are co-extracted, with the result that sulfuric-acid-containing titanylsulfate solutions having an extremely high ratio of sulfuric acid to titanium dioxide (hereinafter referred to as the "acid number") are obtained during stripping of the organic extract with water. As already known, it is not possible to obtain a high-grade $TiO_2$ white pigment from solutions having such high acid numbers by standard methods (Ullmanns Enzyklopädie der technischen Chemie, 4th Edition, Vol. 18, page 576).

In addition, it is known from German No. 2,620,065 that $Ti^{IV}$-ions can also be extracted from the $TiO_2$-thin acid with organic solvent mixtures containing phosphoric acid monoester and/or phosphoric acid diester. Unfortunately, extraction processes such as these give extract phases from which the titanium can no longer be stripped off with water and/or sulfuric acid. Re-extraction can only be achieved by precipitation with ammoniacal aqueous solutions accompanied by conversion of the organic phosphoric acid into partly water-soluble $NH_4^+$-form. However, precipitation reactions carried out in the presence of large quantities of organic components lead to solids highly contaminated with organics which are often difficult to filter and from which it is not possible to obtain a highgrade $TiO_2$ product.

BRIEF DESCRIPTION OF THE INVENTION

A process has now been found by which it is possible to separate the components of black solution laden with foreign metal ions by extraction with an organic extractant and re-extraction of the organic extract phase formed with water and/or a dilute aqueous sulfuric acid into (i) a substantially titanium-free, aqueous sulfuric acid rich in foreign metal salts and (ii) a concentrated, sulfuric-acid-containing titanylsulfate solution substantially free from foreign metal salts which is suitable for hydrolysis.

It has been found that substantially quantitative extraction of the titanylsulfate from black solution may readily be obtained and that the selectivity of the extraction of titanylsulfate with respect to sulfuric acid may be significantly increased providing suitable extractants containing organophosphorus compounds are contacted before and/or during the extraction of the black solution with a sulfuric acid of moderately high and/or high concentration (which optionally contains metal salts) in such a way that the extraction of the titanylsulfate may now be carried out at a significantly lower acid level.

DETAILED DESCRIPTION

Accordingly, the present invention relates to an improvement in the process for the production of high-grade titanium dioxide using the sulfuric acid digestion method. The process starts with reacting ilmenite and-/or titanium-containing slags with concentrated sulfuric acid, dissolving the solid reaction product with water and/or aqueous sulfuric acid, and separating the insoluble raw-material fraction to obtain a sulfuric-acid-containing titanylsulfate solution rich in foreign metal salts (the black solution). In optional steps, trivalent iron can be reduced and after crystallization, iron sulphate heptahydrate can be separated. Thereupon the black solution is hydrolyzed and separation of titanium oxide hydrate precipitation is achieved followed by intensive washing with water, drying and optionally, calcination. In this improved process the black solution is contacted before hydrolysis with an organic medium (hereinafter referred to as the "extractant"). Titanyl sulfate and sulfuric acid from the black solution into the organic extractant leaving the foreign metal salts. The resulting organic phase can be separated from the extracted black solution, this effecting a separation of the titanyl sulfate from the unwanted foreign metal salts. Further removal of unwanted foreign metal salts can be obtained by "scrubbing" the separated organic extract with water or dilute sulfuric acid. Thereafter titanyl sulfate can be recovered from the organic extract by re-extraction (hereinafter referred to as "stripping" with water and-/or an aqueous solution containing sulfuric acid and/or titanylsulfate with recycling of the organic extractant material obtained to the extraction stage.

The extractant used for the separation of titanium from foreign metals contains one or more organophosphorus compounds corresponding to the following formula

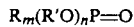

$$R_m(R'O)_nP=O$$

in which
R represents linear or branched alkyl groups,
R' represents alkyl groups as in R, or aryl groups or alkyl substituted aryl groups,
R and/or R' optionally contain heteroatoms such as, for example, oxygen, halogen, phosphorus,
m is an integer 1, 2 or 3 and
n is an integer 1 or 2 or is zero,
with the sum of m and n being 3 and R and R' containing a total of at least 12 carbon atoms, together with from 3 to 15% by weight of water.

Representative organophosphorous compounds of the type in question are, for example, tributylphosphine oxide, trioctylphosphine oxide, butyldibutylphosphinate, dibutylbutylphosphonate, dibutylisobutylphosphonate, diisobutylbutylphosphonate, diisobutylisobutylphosphonate and di-(2-ethylhexyl)-2-ethylhexylphosphonate.

The organic extractant may also contain a diluent. Suitable diluents are aromatic, aliphatic and naphthenic hydrocarbons, optionally containing heteroatoms such as, for example, oxygen, halogen, phosphorus. The diluent used must be chemically inert and substantially insoluble in water and, when the extractant becomes charged with titanylsulfate and/or sulfuric acid, must not lead to separation of the organic extract and/or to the formation of an emulsion.

Finally, the extractant used for the extraction of titanylsulfate from the black solution may also contain sulfuric acid and/or titanylsulfate, for example as a residue after re-extraction, optionally with subsequent aftertreatment, of the organic extract phase containing titanylsulfate and sulfuric acid or after pretreatment of the extractant with an aqueous solution containing sulfuric acid and, optionally metal salts.

The organophosphorus compounds used in accordance with the invention are preferably used in dissolved form. Thus, the trialkylphosphine oxides corresponding to the above formula are generally relatively low-melting solids and, accordingly, are generally dissolved in a liquid organophosphours compound corresponding to the above general formula and/or in an organic diluent. By contrast, the alkylphosphinates and the dialkylphosphonates are mostly more or less viscous liquids and, accordingly, may be used not only in combination with another of the above-mentioned organophosphorus compounds and/or with an organic diluent, but also in undiluted form, depending on their viscosity.

The concentration of organophosphorus compounds corresponding to the above formula in the extractant may vary within wide limits and, more particularly, between 5 and 95% by weight. In practice, however, concentrations of from about 35 to 90% by weight are preferred. With increasing diluent content, the maximum charging of the organic extract phase with TiOSO$_4$ and/or sulfuric acid naturally decreases. In some cases, the organic extract may even separate into an upper phase rich in diluent and a lower phase poorer in diluent. Extractants containing at least 35% by weight of one or more dialkylphosphonates have proved to be particularly suitable.

The ratio of extractant to black solution required for the quantitative extraction of TiOSO$_4$ does of course depend both on the concentration of organophosphorus compounds, corresponding to the above formula, in the extractant and also on the TiOSO$_4$-content of the solution to the extracted. The extractant used preferably contains from 1 to 5 moles of the organophosphorus compounds per mole of TiOSO$_4$ in the solution to be extracted.

An important feature of the process according to the invention is that the concentration of sulfuric acid required for good extractability of the titanium is not established simply by adding a sulfuric acid of moderately high and/or high concentration and optionally containing metal salts to the black solution to be extracted, but by partial charging of the extractant with sulfuric acid before and/or during the extraction of the black solution to increase the extractability of the titanium and also selectivity.

In one embodiment, the extractant is contacted with a sulfuric acid of preferably moderately high or high concentration, optionally containing metal salts, in order to obtain a dilute aqueous sulfuric acid solution or one of moderately high concentration together with an organic phase partially charged with sulfuric acid. This organic phase is subsequently used as extractant for the solvent extraction of titanylsulfate and optionally sulfuric acid from the black solution.

Another embodiment, optionally in combination with the embodiment just described, is characterized in that a sulfuric acid of moderately high or high concentration, and optionally containing metal salts, is introduced during the multistage extraction of titanylsulfate and sulfuric acid. This is done between the first and last stage and preferably spread out over several stages, for example in several mixer-settler stages.

The quantity of sulfuric acid required for charging the extractant with sulfuric acid is of course determined by the extractability of the sulfuric acid which increases with increasing concentration of free sulfuric acid in the solution to be extracted. Accordingly, concentrations of from 40 to 96% by weight $H_2SO_4$ are preferred in practice for the sulfuric acid solution, optionally containing metal salts, used in accordance with the invention.

Depending on the content of this acid, the quantity is then selected in such a way that from 0.1 to 1 mole and preferably from 0.2 to 0.8 mole of sulfuric acid is used per mole of the organophosphorus compounds in the extractant.

Charging the extractant with sulfuric acid before and/or during extraction of the black solution has several advantages. Thus, the quantity of sulfuric acid required for substantially quantitative extraction of the titaylsulfate may be significantly reduced in this way.

Another advantage is that, parallel to the above-mentioned reduction in the quantity of sulfuric acid required, there is an increase in the selectivity of the extraction of titanium, particularly with respect to sulfuric acid and vanadium, leading after re-extraction to $TiOSO_4$-solutions having significantly lower acid numbers and vanadium values.

Finally, there is no longer any danger of iron (II) sulfate being salted out, provided that the black solution to be extracted contains no more than about 8% by weight of iron (II) sulfate.

In addition to titanylsulfate and sulfuric acid, the extract phase emanating from the above-described extraction process also contains from 4 to 15% by weight of dissolved water and, in general, is contaminated with up to about 0.1% by weight of foreign metals in salt form, primarily Fe and also—in ppm-concentrations—Al, Mg, Mn, V, Cr. Accordingly, another feature of the present invention is that the extract phase obtained during extraction of the black solution is subjected before stripping to intermediate washing (hereinafter referred to a "scrubbing") with water and/or an aqueous solution containing sulfuric acid and/or titanylsulfate.

The scrubbing step produces on the one hand an organic phase containing titanylsulfate and sulfuric acid which is substantially free from foreign metal salts and, on the other hand, an aqueous sulfuric acid solution containing foreign metals and, optionally, titanium which is preferably recycled to the extraction of the black solution to recover the titanium content.

Scrubbing has a very good cleaning effect for quantitative ratios of washing liquid to extract of from 1:50 to 1:5 and more especially from 1:30 to 1:10 and for sulfuric acid concentrations of the washing liquid used of from 0 to 40% by weight and preferably from 0 to 25% by weight. If, both in the extraction step and in the scrubbing step, the quantity and concentration of the sulfuric acid solution used are selected in such a way that the aqueous solution obtained in the scrubbing contains less than 40% by weight of free sulfuric acid, part of the titanylsulfate is also transferred together with the foreign metal values and, optionally, part of the sulfuric acid to said aqueous solution from which the titanium may be recovered by recycling to the extraction of the black solution.

The organic phase freed from foreign metal salts which is obtained in the scrubbing step is then subjected to re-extraction (stripping) by washing with water and/or a dilute aqueous solution containing sulfuric acid and/or titanylsulfate. A sulfuric-acid-containing $TiOSO_4$ aqueous solution substantially free from foreign metal salts and an organic phase largely freed from titanylsulfate and sulfuric acid are obtained in this manner.

The titanylsulfate concentration in the aqueous phase obtained depends on the quantitative ratio of aqueous stripping liquid to organic phase. If this ratio is adjusted to between 1:10 and 1:1, the concentration of $TiOSO_4$ generally reaches between 10 and 45% by weight, in the aqueous phase.

In cases where it is desired to obtain highly concentrated, (for example 30 to 45% by weight) $TiOSO_4$ aqueous solutions, the stripped organic phase generally contains residual concentrations of from 0.3 to 3% by weight $TiOSO_4$. If an organic phase such as this containing residual titanium is recycled to the extraction stage, the titanium content may even be completed or partly transferred to the aqueous phase with which it comes into contact.

Accordingly, it can be of advantage to recover the residual titatium from the stripped organic phase, for which purpose the stripped organic phase is additionally washed with water and/or dilute aqueous sulfuirc acid (optionally containing metal salts) in a quantitative sulfuric acid by concentration and recycling for example to the digestion process.

If it is not intended to use the $TiO_2$ as a pigment, the calcination step may, of course, be omitted.

The process according to the invention is particularly suitable for continuous operation. Accordingly, it is possible to use any extraction apparatus built on the counter-current principle, especially extraction columns and multistage mixer-settler combinations. Under economically optimal conditions, the theoretical number of stages is about 5 and 10 stages for the titanylsulfate and sulfuric acid extraction, between 2 and 4 stages for scrubbing, between 2 and 6 stages for re-extraction and between 1 and 4 stages for the aftertreatment.

The component processes described above may all be carried out at temperatures in the range of from about 15° to about 70° C. At higher temperatures, the danger of spontaneous hydrolysis of the titanylsulfate increases. In ilmenite-based digestion processes, it is advisable for practical reasons to carry out the extraction of titanylsulfate and, optionally, sulfuric acid at a temperature of at least 35° C. in order to avoid the separation of crystalline iron sulfate from the black solution and from the various aqueous phases rich in iron sulfate which are obtained during the process.

In the production of $TiO_2$ pigments, the process according to the invention affords several advantages over conventional processes. It is a process by means of which it is possible on an industrial scale to produce $TiOSO_4$ solutions of high titanium content which are substantially free from foreign metal salts and which have acid numbers below 2.3 and even below 1.9 for titanium yields of up to 99.5%: ratio of washing liquid to organic phase of from 1:20 to 1:1. This gives an organic extractant generally containing less than 0.2% by weight $TiOSO_4$ which may be returned to the extractions stage. The dilute aqueous washing water containing titanylsulfate and, generally, sulfuric acid may advantageously be used as washing liquid both in the scrubbing stage and also in the re-extraction stage.

Accordingly, the present invention involes several solvent extractions combined with one another: (i) an extraction, in one or several steps, in which titanylsulfate and sulfuric acid are transferred to an organic medium, (ii) optionally a scrubbing stage to remove the co-entrained foreign metal salts and part of the co-extracted sulfuric acid, (iii) a re-extraction stage, in which the titanylsulfate and the sulfuric acid are largely stripped from the organic medium, and (iv) optionally an aftertreatment of the stripped organic phase for completely recovering the titanium values.

Though the purification of the black solution by titanium solvent extraction, the process according to the invention gives, on the one hand, a $TiOSO_4$ solution substantially free from foreign metal salts which may subsequently be worked up into $TiO_2$ pigments by hydrolysis and calcination, and on the other hand, a sulfuric acid solution substantially free from titanium which contains the full foreign metal salt content of the black solution used. Accordingly, the dilute sulfuric acid solution (thin acid) which accumulates during hydrolysis contains virtually no foreign metal ions. The titanium content of this solution may be completely recovered together with the

|  | Analytical composition of The $TiOSO_4$ solution |
| --- | --- |
| $TiOSO_4$ | 30 to 45% by weight |
| $H_2SO_4$, free | 10 to 20% by weight |
| Acid number | 1.7 to 2.3 |
| Fe | <10 ppm |
| Al | <5 ppm |
| Mg | <5 ppm |
| Mn | <5 ppm |
| V | <30 ppm |
| Cr | <15 ppm |

$TiOSO_4$ solutions such as these are hydrolyzable and, after calcination of the titanium oxide hydrate, lead to particularly high grade $TiO_2$, without regard to the foreign metal content of the titanium raw materials used.

Another advantage is that the thin acid accumulating during hydrolysis is substantially free from foreign metals. Accordingly, the titanium content of this aqueous acid may be completely recovered by concentration and recycling of the high-percentage sulfuric acid obtained, for example to the digestion process.

Finally, in digestion processes based on ilmenite, it is even possible to dispense with the cooling crystallization of the black solution to separate the iron sulfate in heptahydrate form, provided that the extraction of the black solution is carried out in extraction apparatus particularly suitable for suspensions. Carried out in this way, the extraction process gives suspensions of $FeSO_4.7H_2O$ in an aqueous sulfuric acid solution particularly heavily laden with foreign metals. From metal sulphate containing sulfuric acid solutions such as these salts that are crystalline, including iron sulfate, crystallize out in any way during the concentration process for recovery of the sulfuric acid.

BRIEF DESCRIPTION OF THE DRAWING

The FIGURE illustrates in diagramatic from one embodiment of the present invention which is continuous in nature.

The reference numerals have the following meanings:
1 = countercurrent apparatus for extraction
2 = countercurrent apparatus for scrubbing
3 = countercurrent apparatus for stripping
4 = countercurrent apparatus for the aftertreatment
5 = conduit for the black solution
6 = conduit for sulfuric acid of moderately high or high concentration
7 = conduit for the extracted sulfuric acid solution containing foreign metal salts
8 = conduit for the scrubbing liquid
9 = conduit for the aqueous phase obtained during scrubbing
10 = conduit for the stripping liquid
11,12 = water conduits
13 = conduit for the $TiOSO_4$ solution obtained during stripping
14 = conduit for the washing water obtained during the aftertreatment
15 = conduit for the circulated extractant
16 = conduit for the extract phase
17 = conduit for the organic scrubbing phase
18 = conduit for the organic stripping phase This embodiment of the process is carried out as follows:

The black solution 5 to be extracted and the aqueous titanium-containing phase 9 which is obtained during scrubbing are contacted together with the organic extractant 15 in a multistage countercurrent apparatus 1. During extraction, a sulfuric acid 6 of moderately high or high concentration is introduced in several component streams so that the extractant is charged sufficiently highly with sulfuric acid over several stages to guarantee selective and, at the same time, quantitative extraction. A substantially titanium-free sulfuric acid solution 7 containing foreign metal salts is obtained. In another multistage countercurrent apparatus 2, the organic extract 16 which is obtained during extraction is subjected to scrubbing with an aqueous liquid 8, whereby an organic phase 17 substantially free from foreign metal salts is obtained.

The titanylsulfate and the sulfuric acid are stripped from the organic phase 17 with an aqueous liquid 10 in a multistage countercurrent apparatus 3.

The resulting aqueous sulfuric acid-titanyl sulfate solution is recovered through 13, leaving an organic phase 18 largely free from titanylsulfate and sulfuric acid. The organic phase 18 is aftertreated with water 12 in a multistage countercurrent apparatus 4. The washing water 14 leaving the aftertreatment is used as stripping liquid and/or as scrubbing liquid and the aftertreated organic phase is returned to the extraction stage 1 via 15.

The following Examples are intended to illustrate the process according to the invention without limiting it in any way.

The black solutions used in the Examples have the composition shown in Table 1 below:

TABLE 1

| | Composition of the black solutions | | | | |
|---|---|---|---|---|---|
| | A | B | C | D | E |
| $H_2SO_4$ free (% by weight) | 11.3 | 12.0 | 9.6 | 10.3 | 12.4 |
| $TiO_2$ (% by weight) | 15.3 | 15.7 | 15.3 | 14.7 | 13.1 |
| Fe (% by weight) | 2.00 | 1.95 | 1.89 | 1.60 | 2.47 |
| Al (% by weight) | | | | 0.36 | 0.30 |
| Mg (% by weight) | | | | 0.70 | 0.18 |
| V (ppm) | | | | 713 | 497 |
| Cr (ppm) | | | | 258 | 317 |
| Mn (ppm) | | | | 309 | 1325 |

EXAMPLE 1

A mixture of 1000 parts by weight of black solution A and 1500 parts by weight of 65% $H_2SO_4$ was contacted in countercurrent at 50° C. with 2095 parts by weight of water-saturated dibutylbutylphosphonate (DBBP) in 4 mixer-settler stages. 1684 parts by weight of extracted aqueous phase and 2911 parts by weight of extract phase having the following composition were obtained:

| | Aqueous phase | Extract phase |
|---|---|---|
| $H_2SO_4$ (% by weight) | 33.0 | 16.8 |
| $TiO_2$ (% by weight) | 0.090 | 5.20 |
| Acid number | | 4.5 |
| Fe (ppm) | | 323 |
| V (ppm) | | 231 |
| Cr (ppm) | | 25 | the titanium extraction yield comprises 99.0%.

EXAMPLE 2

This Example shows that the selectivity of the extraction of titanium with respect to sulfuric acid and foreign metals can be improved by reducing the $H_2SO_4$ concentration of the solution to be extracted.

A mixture of 1000 parts by weight of black solution B and 1216 parts by weight of 52% sulfuric acid was extracted in countercurrent at 40° C. with 2097 parts by weight of water-saturated DBBP in 8 mixer-settler stages. 1574 parts by weight of extracted aqueous phase and 2739 parts by weight of extract phase were obtained.

It is apparent from the composition shown below that the extract phase has a somewhat lower concentration of sulfuric acid (acid number: 3.8 as opposed to 4.5) and foreign metals than the extract phase of Example 1. The titanium yield comprises 96.7%.

| | Aqueous phase | Extract phase |
|---|---|---|
| $H_2SO_4$ (% by weight) | 22.8 | 13.3 |
| $TiO_2$ (% by weight) | 0.33 | 5.25 |
| Acid number | | 3.8 |
| Fe (ppm) | | 222 |
| V (ppm) | | 135 |
| Cr (ppm) | | 18 |

EXAMPLE 3

The selectivity of the extraction of titanium can also be increased by scrubbing of the extract phase.

1000 parts by weight of black solution C were mixed with 480 parts by weight of aqueous phase II from the scrubbing stage and 519 parts by weight of 80% sulfuric acid. This mixture was contacted in countercurrent at 40° C. with 2014 parts by weight of water-saturated DBBP in 6 mixer-settler stages. On the one hand 1240 parts by weight of extracted aqueous phase I and, on the other hand, 2773 parts by weight of extract phase were obtained.

The extract phase was subjected to scrubbing by countercurrent extraction in 4 stages with 325 parts by weight of water, giving 480 parts by weight of aqueous phase II, which was used in the extraction of the black solution, and 2618 parts by weight of organic phase III.

The phases I and III showed the following analytical data:

| | Aqueous phase I from extraction | Organic phase III from scrubbing |
|---|---|---|
| $H_2SO_4$ free (% by weight) | 23.9 | 8.1 |
| $TiO_2$ (% by weight) | 0.101 | 5.86 |
| Acid number | | 2.6 |
| Fe (ppm) | | <2 |
| V (ppm) | | 71 |
| Cr (ppm) | | 5 |

By combining the extraction process with a scrubbing stage, it is possible to obtain organic Ti-containing phases which, by comparison with Example 2, are characterized by comparatively lower concentrations of sulfuric acid and foreign metals.

The titanium extraction yield is substantially quantitative (99.2%) despite the greatly reduced input of $H_2SO_4$. However, if the quantity of the 80% sulfuric acid is reduced even further, the yield decreases without any significant increase in selectivity with respect to sulfuric acid:

| 80% $H_2SO_4$ (parts by weight) | Residual $TiO_2$ in phase I | Yield $TiO_2$ | Acid number in phase III |
|---|---|---|---|
| 519 | 0.101% by weight | 99.2% | 2.6 |
| 472 | 0.144% by weight | 98.8% | 2.8 |
| 456 | 0.272% by weight | 97.7% | 2.5 |

EXAMPLE 4

The sulfuric acid is not mixed with the black solution to be extracted, but instead is introduced during the extraction process. In this way, it is possible to obtain a considerable increase in selectivity with respect to sulfuric acid and with respect to vanadium.

1000 parts by weight of black solution D and 447 parts by weight of aqueous phase II from the scrubbing stage were contacted in countercurrent at 40° C. in a 9-stage mixer-settler battery with 2745 parts by weight of an extractant having the following composition:

| DBBP: | | 60.8% by weight |
|---|---|---|
| Aromatic-free diluent: | | 34.5% by weight |
| TiO$_2$: | | 0.16% by weight |
| H$_2$O: | approx. | 4.5% by weight |

During extraction, 66 parts by weight of 80% H$_2$SO$_4$ were delivered to stage 4, 83 parts by weight to stage 6 and 189 parts by weight to stage 8. 1116 parts by weight of extracted aqueous phase I and 3414 parts by weight of extract phase were obtained. The extract phase was then subjected to scrubbing in 4 stages using 265 parts by weight of an aqueous solution containing 1.5% by weight of TiO$_2$ and 7.6% by weight of free sulfuric acid, giving 447 parts by weight of an aqueous phase II, which was used in the extraction of the black solution, and 3232 parts by weight of an organic phase III.

The phases I and II have the following analytical data:

| | Aqueous phase I from extraction | Organic phase III from scrubbing |
|---|---|---|
| H$_2$SO$_2$ free (% by weight) | 24.5 | 3.9 |
| TiO$_2$ (% by weight) | 0.29 | 4.52 |
| Acid number | | 2.1 |
| Fe (% by weight) | 1.66 | <0.0010 |
| Al (% by weight) | 0.20 | 0.0008 |
| Mg (% by weight) | 0.54 | <0.0001 |
| V (ppm) | 490 | 6 |
| Cr (ppm) | 201 | <1 |
| Mn (ppm) | 270 | <1 |

Accordingly the residual TiO$_2$ content of the extracted aqueous phase I is 0.29% by weight, corresponding to a yield of 98.7%, based on the black solution.

If the titanium content of the extractant used in this Example is reduced by washing to values below 500 ppm TiO$_2$, comparable tests give residual TiO$_2$ values in the aqueous phase I of approximately 0.10% by weight, corresponding to a yield of more than 99%.

EXAMPLE 5

3353 parts by weight of an organic phase III having the following composition:

| DBBP: | approx. | 49% by weight |
|---|---|---|
| Aromatic-free diluent: | approx. | 28% by weight |
| H$_2$O: | approx. | 7% by weight |
| H$_2$SO$_4$ free: | | 4.7% by weight |
| TiO$_2$: | | 5.46% by weight |
| Acid number: | | 2.1 |
| Fe: | | <15 ppm |
| Al: | | <5 ppm |
| Mg: | | <5 ppm |
| V: | | 3 ppm |
| Cr: | | 4 ppm |
| Mn: | | <1 ppm | emanating from extraction of the ilmenite black solution E following by scrubbing, were stripped in countercurrent at 40° C. with 343 parts by weight of water in a 4-stage mixer-settler apparatus to obtain 819 parts by weight of TiOSO$_4$ solution V on the one hand and 2877 parts by weight of organic phase on the other hand. The organic phase was then washed in 3 stages with 263 parts by weight of water, again at 40° C., to form 378 parts by weight of washing water V and 2762 parts by weight of organic phase VI.

| | TiOSO$_4$ solution IV | Washing water V | Org. phase VI |
|---|---|---|---|
| H$_2$SO$_4$ free (% by weight) | 11.1 | 16.6 | 0.4 |
| TiO$_2$ (% by weight) | 20.5 | 4.1 | 0.02 |
| Acid number | 1.77 | | |
| Fe (ppm) | <10 | <10 | <10 |
| Al (ppm) | <2 | <2 | <5 |
| Mg (ppm) | <5 | <5 | <5 |
| V (ppm) | 8 | <1 | <1 |
| Cr (ppm) | 9 | 3 | <1 |
| Mn (ppm) | <1 | <1 | <1 |

Accordingly, the organic phase VI may readily be used as extractant in the extraction of the black solution, whilst the washing water V may be used both as a scrubbing liquid and as a stripping liquid to recover the titanium content.

Finally, the above-mentioned TiOSO$_4$ solution IV was worked up by hydrolysis, filtration, washing, drying and calcination to form a particularly high-grade TiO$_2$ pigment having the following foreign metal contents:

| Fe: | 3 ppm | V: | 3 ppm |
|---|---|---|---|
| Al: | <4 ppm | Cr: | 2 ppm |
| Mg: | <1 ppm | Mn: | <1 ppm |

TiOSO$_4$ solutions such as these may also be used for the production of high-purity titanium oxide hydrate or titanium dioxide products which may subsequently serve as starting materials for the production of inorganic titanates.

What is claimed is:

1. In the improved process for the production of high-grade titanium dioxide by the sulfuric acid digestion method wherein:
   (a) ilmenite, or titanium-containing slag is reacted with concentrated sulfuric acid,
   (b) the reaction product from (a) is dissolved in water or aqueous sulfuric acid,
   (c) the insoluble raw-material fraction is separated from the solution from (b) to recover a sulfuric-acid-containing titanylsulfate black solution rich in foreign metal salts, and
   (d) titanyl sulfate is hydrolyzed with subsequent separation of precipated titanium oxide hydrate followed by washing with water and drying the improvement comprises extracting titanyl sulfate from the black solution before the step (d) with an organic medium containing an organophosphorus compound of the formula $$R_m(R^1O)_nP=O$$

wherein
R represents linear or branched alkyl groups,
R$^1$ represents alkyl groups as in R or aryl groups or alkyl substituted aryl groups
m is an integer, 1, 2 or 3 and n is an integer, 1 or 2 or is zero
with the proviso that the sum of m and n is 3 and the organophosphorus compound contains a total of at least 12 carbon atoms and contacting the organic medium before or during the extraction with a sulphuric acid solution or a metal salt containing sulphuric acid solution to produce a titanyl sulfate-rich organic phase and a foreign metals-rich aqueous phase, separating the organic phase from the aqueous phase and re-extracting titanyl sulfate from the organic phase with water or a dilute aqueous sulfuric acid or titanyl sulfate containing solution.

2. A process as claimed in claim 1 wherein the organic medium contains 3 to 15% by weight of water and one or more organophosphorus compounds corresponding to the formula $$R_m(R'O)_nP=O$$

wherein
R represents linear or branched alkyl group,
R' represents alkyl groups as in R or aryl groups or alkyl substituted aryl groups
m is an integer, 1, 2 or 3 and
n is an integer, 1 or 2 or is zero
with the proviso that the sum of m and n is 3 and the organophosphorus compound contains a total of at least 12 carbon atoms.

3. A process as claimed in claim 2 wherein the organic medium also contains aromatic, aliphatic or naphthenic hydrocarbons as a diluent, optionally containing heteroatoms such as oxygen, halogen and phosphorus.

4. A process as claimed in claim 1, wherein the organic medium contains from 1 to 5 moles of the organophosphorus compound per mole of titanylsulfate to be extracted.

5. A process as claimed in claim 1, wherein the concentration of the organophosphorus compound in the organic medium is from 5 to 95% by weight.

6. A process as claimed in claim 5 wherein the concentration of the organophosphorus compound in the organic medium is from 35 to 90% by weight.

7. A process as claimed in claim 1 wherein the sulphuric acid solution or the metal salt containing sulphuric acid solution which is contacted with the organic medium has a concentration of at least 40% by weight of sulphuric acid.

8. A process as claimed in claim 7 wherein the amount of sulfuric acid used in the extraction is 0.2 to 0.8 mole per mole of organophosphorus compound.

9. A process as claimed in claim 1, wherein the separated titanyl sulfate-rich organic extract phase is subjected to an intermediate washing with water or a sulfuric acid containing aqueous solution or a titanyl sulfate containing aqueous solution before the re-extraction.

10. A process as claimed in claim 9 wherein the aqueous solution resulting from said intermediate washing is recycled to the extraction of the black solution.

11. A process as claimed in claim 1, wherein the organic phase obtained from the re-extraction step is subjected to an aftertreatment by washing with water or a dilute aqueous solution containing sulfuric acid or a dilute aqueous solution containing metal salts and then recycled to the extraction of black solution.

12. A process as claimed in claim 7, wherein from 0.1 to 1 mole of sulfuric acid per mole of the organo-phosphorus compound is used in the extraction.

13. A process as claimed in claim 1 wherein the organic medium comprises tributylphosphine oxide, trioctylphosphine oxide, butyldibutylphosphinate, dibutylbutylphosphonate, dibutylisobutylphosphonate, diisobutylbutylphosphonate, diisobutylisobutylphosphonate or di-(2-ethylhexyl)-2-ethylhexylphosphonate.

14. A process as claimed in claim 1 wherein the organic medium consists essentially of water-saturated dibutylbutylphosphonate.

15. A process as claimed in claim 1 wherein the sulfuric acid which contacts the organic medium before or during the extraction has a concentration of from 40 to 96% by weight.

* * * * *